(12) United States Patent  (10) Patent No.: US 6,686,979 B2
Yoshino  (45) Date of Patent: Feb. 3, 2004

(54) DISPLAY PANEL

(75) Inventor: Hiroji Yoshino, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/965,027

(22) Filed: Sep. 27, 2001

(65) Prior Publication Data

US 2002/0075425 A1 Jun. 20, 2002

(30) Foreign Application Priority Data

Sep. 28, 2000 (JP) ........................................ 2000-296489

(51) Int. Cl.⁷ ............................................ G02F 1/1333
(52) U.S. Cl. ........................................... 349/58; 349/12
(58) Field of Search ............................ 349/58, 12, 24, 349/62, 61, 65, 66; 361/681

(56) References Cited

U.S. PATENT DOCUMENTS 5,442,470 A * 8/1995 Hashimoto ................... 349/58
5,936,619 A * 8/1999 Nagasaki et al. ........... 345/205

* cited by examiner

Primary Examiner—Toan Ton
Assistant Examiner—David Chung
(74) Attorney, Agent, or Firm—Frommer Lawrence & Haug LLP; William S. Frommer; Leonard J. Santisi

(57) ABSTRACT

A liquid crystal panel and a light guide plate are held by a holding member which covers at least a portion of a surface of the light guide plate remote from the liquid crystal panel. A circuit attachment plate supporting a liquid crystal driver circuit board with a liquid crystal driver circuit mounted thereon is positioned within the area of the liquid crystal panel and mounted on the holding member remotely from the liquid crystal panel with the light guide plate interposed therebetween. The holding member is molded of a resin material, and has positioning ribs for positioning a tablet sensor board on the holding member. A portion of the tablet sensor board that is positioned by the positioning ribs is inserted in an installation space defined between the circuit attachment plate and the holding member.

6 Claims, 9 Drawing Sheets

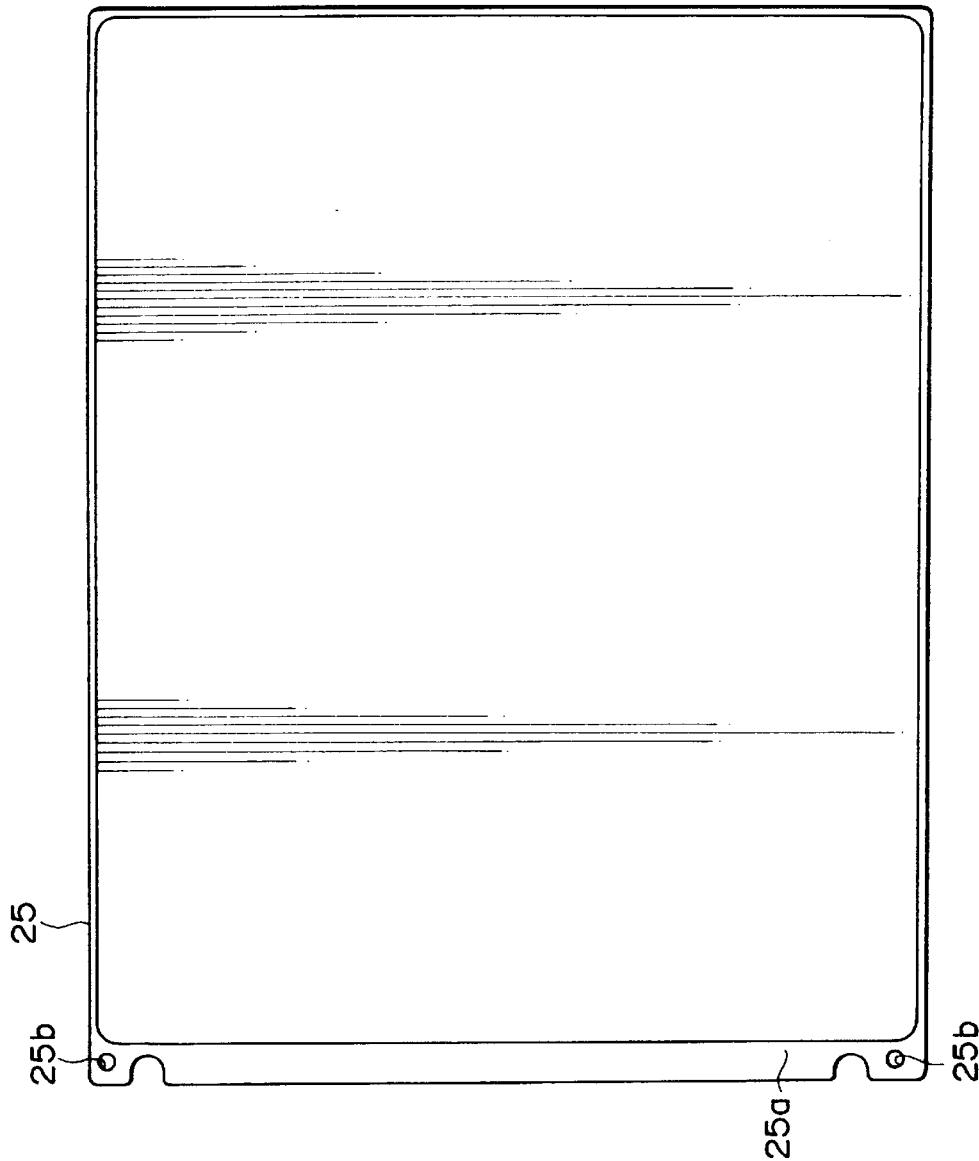

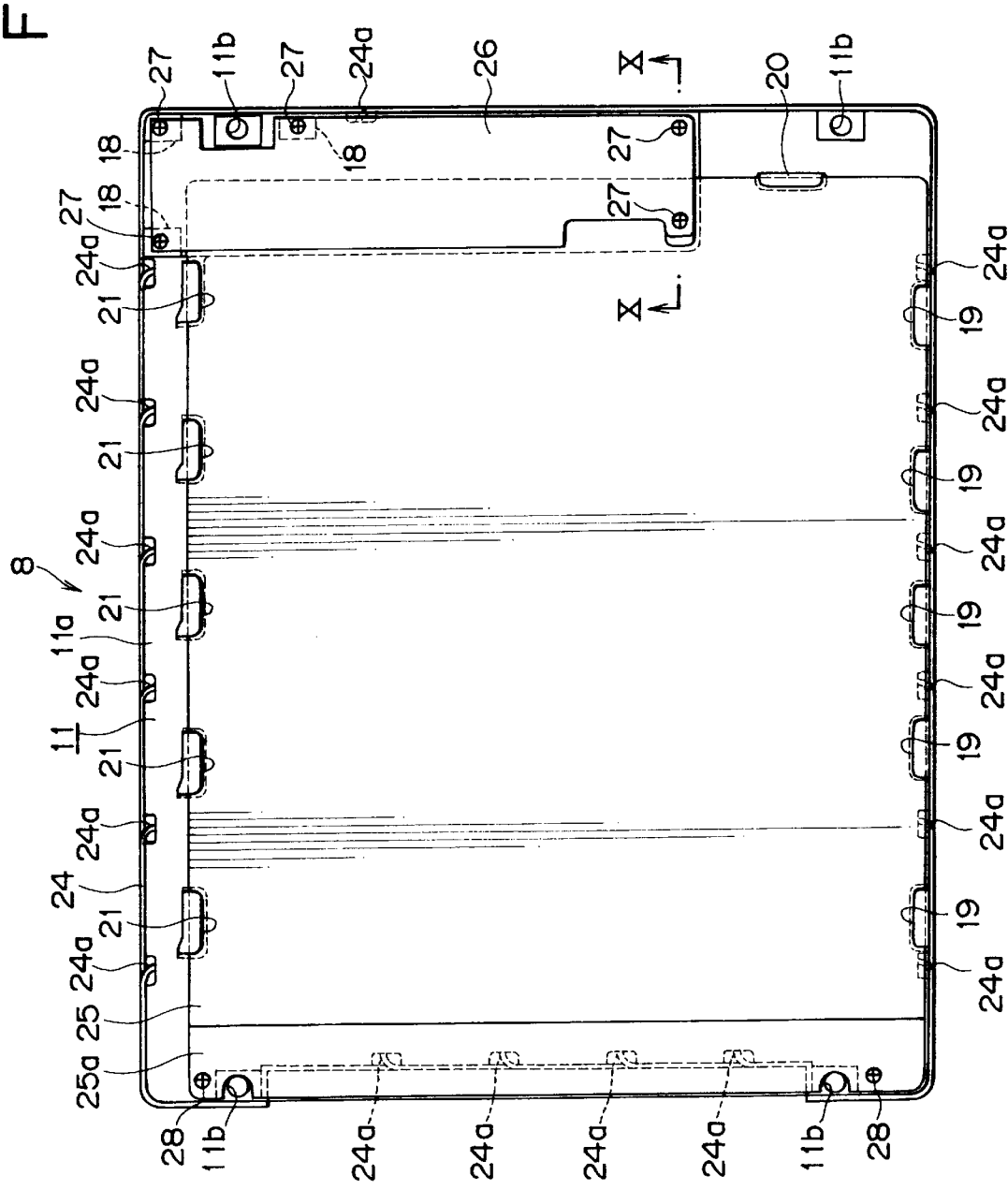

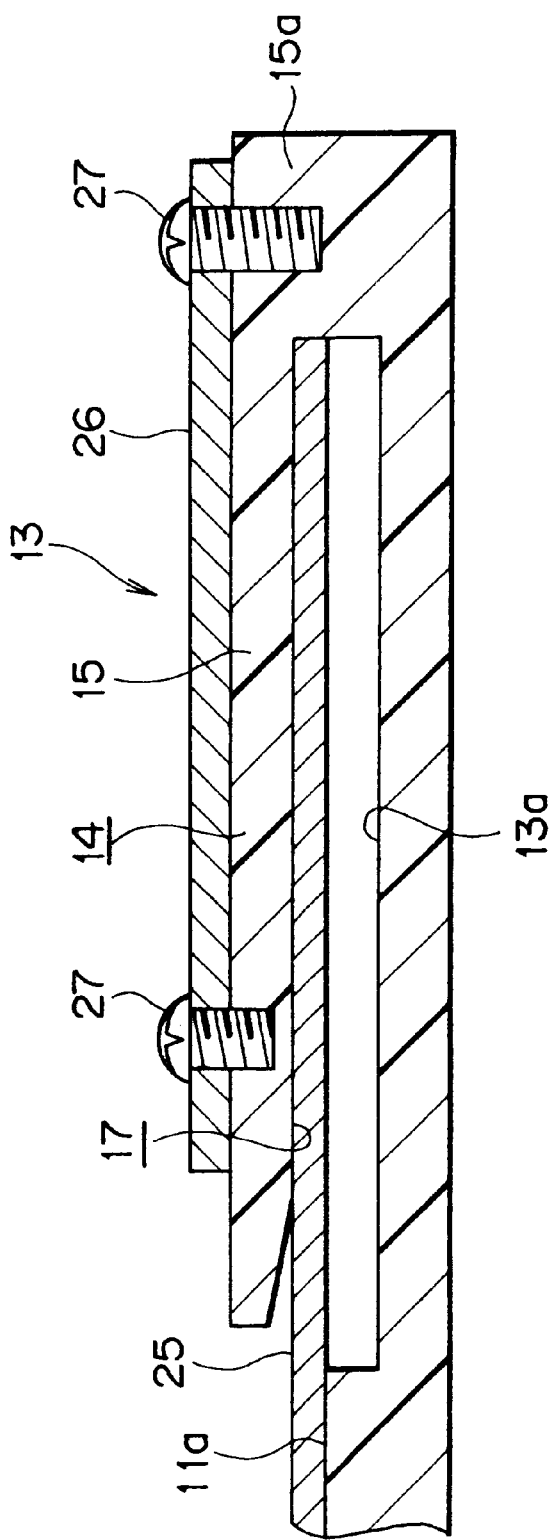

DISPLAY PANEL

BACKGROUND OF THE INVENTION

The present invention relates to a display panel, and more particularly to the art of a display panel for use on an information processing device or the like, the display panel having a liquid crystal panel, a light guide plate, and a tablet sensor board.

Information processing devices such as personal computers or the like have a computer unit and a display unit including a keyboard and a display panel.

Some display panels have a liquid crystal panel and a light guide plate for guiding light from a light source to the liquid crystal panel that is controlled by a liquid crystal driver circuit. Some information processing devices allow the user to use an input stylus to enter characters, figures, etc. via a display panel. The display panel of such an information processing device has, in addition to a liquid crystal panel and a light guide plate, an electromagnetic-induction-type tablet sensor board mounted on a surface of the liquid crystal panel remote from the light guide plate.

In the conventional display panel with the tablet sensor board, a liquid crystal driver circuit board with a liquid crystal driver circuit mounted thereon is disposed directly behind the liquid crystal panel. Therefore, it has been customary to assemble the display panel by temporarily rolling up the liquid crystal driver circuit board, placing the tablet sensor board, positioning the tablet sensor board with respect to the light guide plate, and then attaching the tablet sensor board to the back of the light guide plate with an adhesive tape.

However, because the liquid crystal driver circuit board is temporarily rolled up, the tablet sensor board is then placed, and a dedicated jig is used to position the tablet sensor board, the assembling process is tedious, time-consuming, and inefficient.

Using the jig to position the tablet sensor board is problematic in that the positioning process is liable to cause positioning variations and the tablet sensor board tends to be positioned with unreliable positioning accuracy.

Furthermore, inasmuch as the tablet sensor board is manually attached using the adhesive tape, the assembling process is time-consuming, making it difficult to mass-produce the display panel. In addition, the installed tablet sensor board is apt to be displaced out of position when the adhesive tape is degraded due to aging or temperature changes.

SUMMARY OF THE INVENTION

It is an object of the present invention to provide a display panel which can be assembled with increased efficiency and has a tablet sensor board positioned with increased accuracy.

According to an aspect of the present invention, there is provided a display panel comprising a thin sheet-like panel energizable by a driver circuit for displaying information, a holding member holding the thin sheet-like panel in covering relation to at least a portion of a rear surface of the thin sheet-like panel, a first edge positioning rib projecting from a rear surface of the holding member remote from a front surface thereof which holds the thin sheet-like panel, and extending along one edge of the holding member, a second edge positioning rib disposed on the holding member and extending along an opposite edge thereof remote from the first edge positioning rib, and a sheet-like electromagnetic-induction-type tablet sensor board held on the rear surface of the holding member by the first edge positioning rib and the second edge positioning rib.

With the above arrangement, no dedicated jig needs to be used to position the tablet sensor board, and the tablet sensor board is attached to the holding member by being inserted into an installation space defined by the inner surface of a circuit attachment plate on which a liquid crystal driver circuit board is mounted. Therefore, the tablet sensor board can be positioned with highly reliable positioning accuracy, and the display panel can be assembled with utmost ease.

Inasmuch as it is not necessary to use an adhesive tape to attach the tablet sensor board to the holding member, the display panel can be assembled easily in a short period of time. Thus, the display panel can be mass-produced, and the tablet sensor board is free of undesirable positional displacements which would otherwise occur when the adhesive tape would be degraded due to aging or temperature changes.

Furthermore, the holding member may be molded of a resin material, and hence it may not obstruct or impair the magnetic field that is generated when the operator enters data with an input stylus, thus allowing the operator to enter data appropriately through the display panel.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a rear view of a tablet sensor board;

FIG. 9 is a rear view of the display panel; and

FIG. 10 is an enlarged cross-sectional view taken along line X—X of FIG. 9.

DETAILED DESCRIPTION OF THE PREFERRED EMBODIMENTS

A preferred embodiment of the present invention as applied to a display panel on a display unit of a desktop personal computer as an information processing device will be described below with reference to the drawings.

Figure 1:
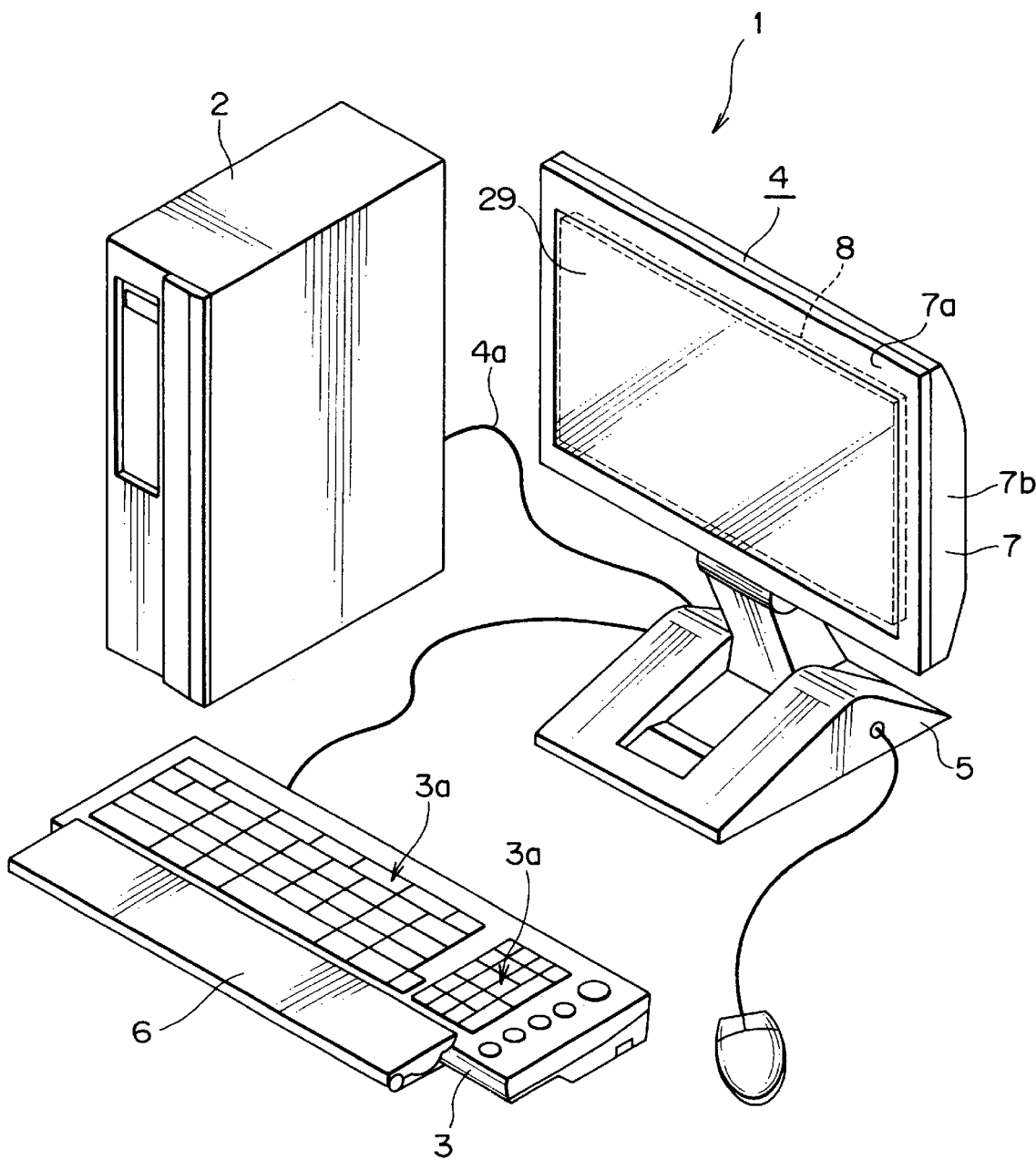
FIG. 1 is a perspective view of an information processing device incorporating a display panel according to the present invention.

As shown in FIG. 1, an information processing device 1 comprises a computer unit 2, a keyboard 3, a display unit 4, and a stand 5 supporting the display unit 4 thereon.

The computer unit 2 is of the vertical type that is vertically elongate as viewed in front elevation, and houses a processing means such as a CPU (Central Processing Unit). The computer unit 2 performs various processing sequences based on signals entered when keys 3a on the keyboard 3 are pressed. The keyboard 3 supports a keyboard cover 6 for opening and closing the keys 3a.

The display unit 4 has a display panel 8 on the front face of a display panel assembly 7. The display panel assembly 7 comprises a front panel 7a on which the display panel 8 is mounted and a rear panel 7b, the front and rear panels 7a, 7b being joined face to face to each other. The rear panel 7b has a rear surface supported on the upper end of the stand 5. The display unit 4 is connected to the computer unit 2 by a connecting cable 4a.

The display panel 8 has a liquid crystal panel 9 and a light guide plate 10, each in the form of a thin sheet. The liquid crystal panel 9 and the light guide plate 10 are held face to face against each other, and held by a holding member 11, as shown in FIG. 2.

The holding member 11 is molded of a resin material in a horizontally elongate, substantially rectangular shape which is greater than the liquid crystal panel 9 and the light guide plate 10. The liquid crystal panel 9 and the light guide plate 10 are held on a front surface of the holding member 11.

Figure 2:
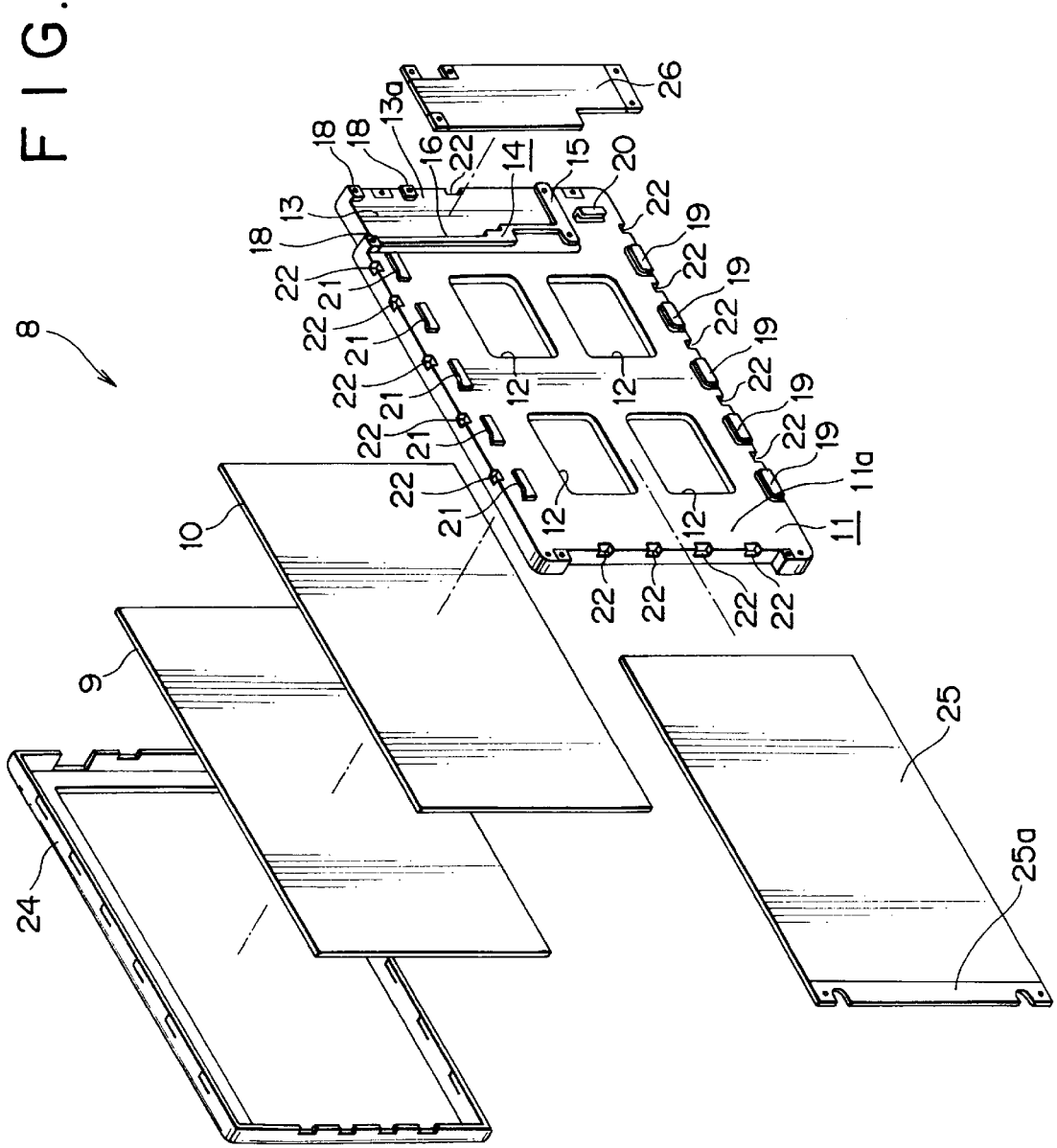
FIG. 2 is an exploded perspective view of the display panel.
Figure 3:
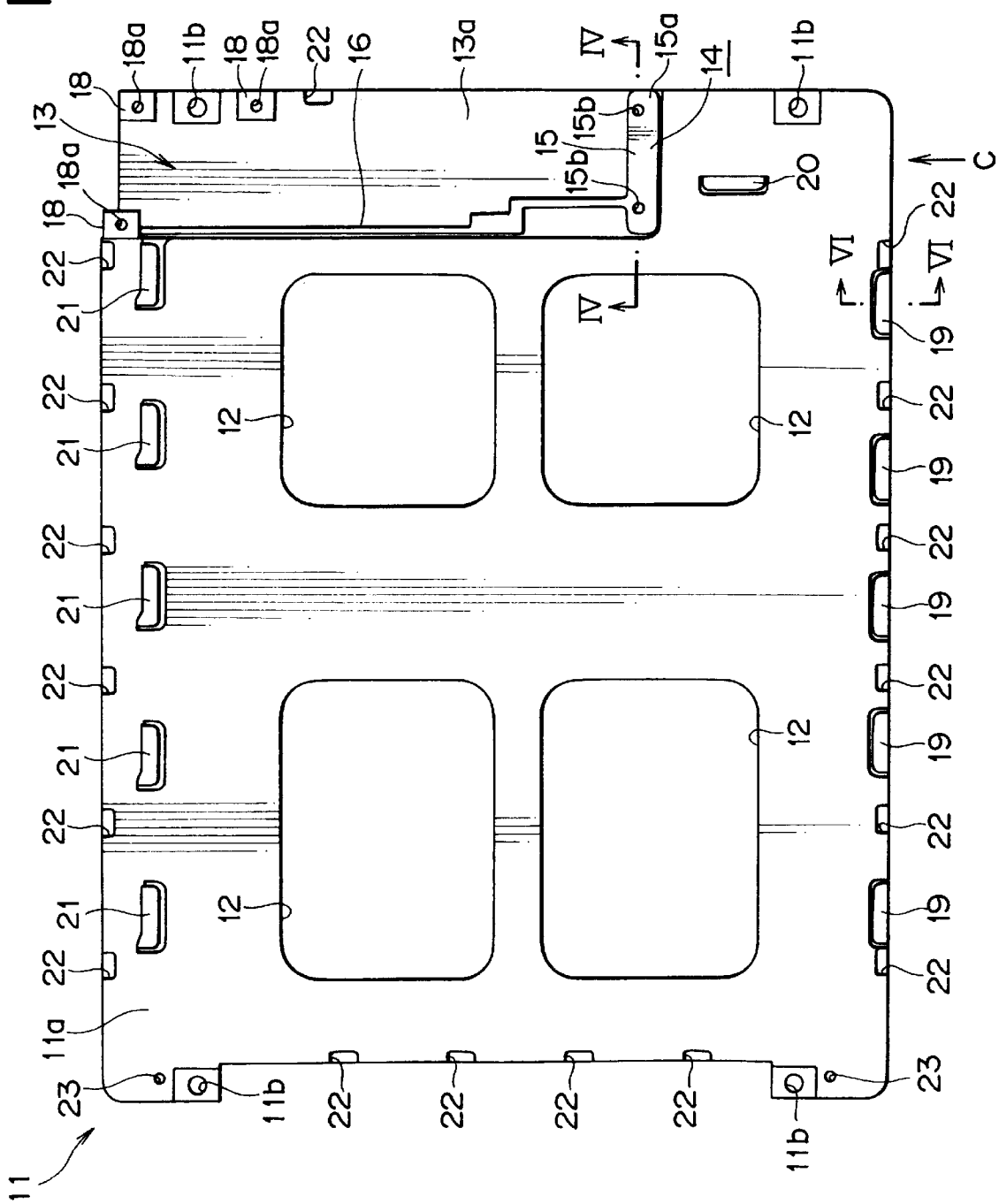
FIG. 3 is a rear view of a holding member of the display panel.

The holding member 11 has four large holes 12 defined in a rear surface 11a thereof, as shown in FIGS. 2 and 3. The rear surface 11a has a left end portion formed as a circuit attachment 13 except a lower end portion thereof. A circuit attachment plate 14 integral with the holding member 11 is mounted on the circuit attachment 13. The circuit attachment 13 has a shallow recess 13a defined in a substantially full area thereof.

Figure 4:
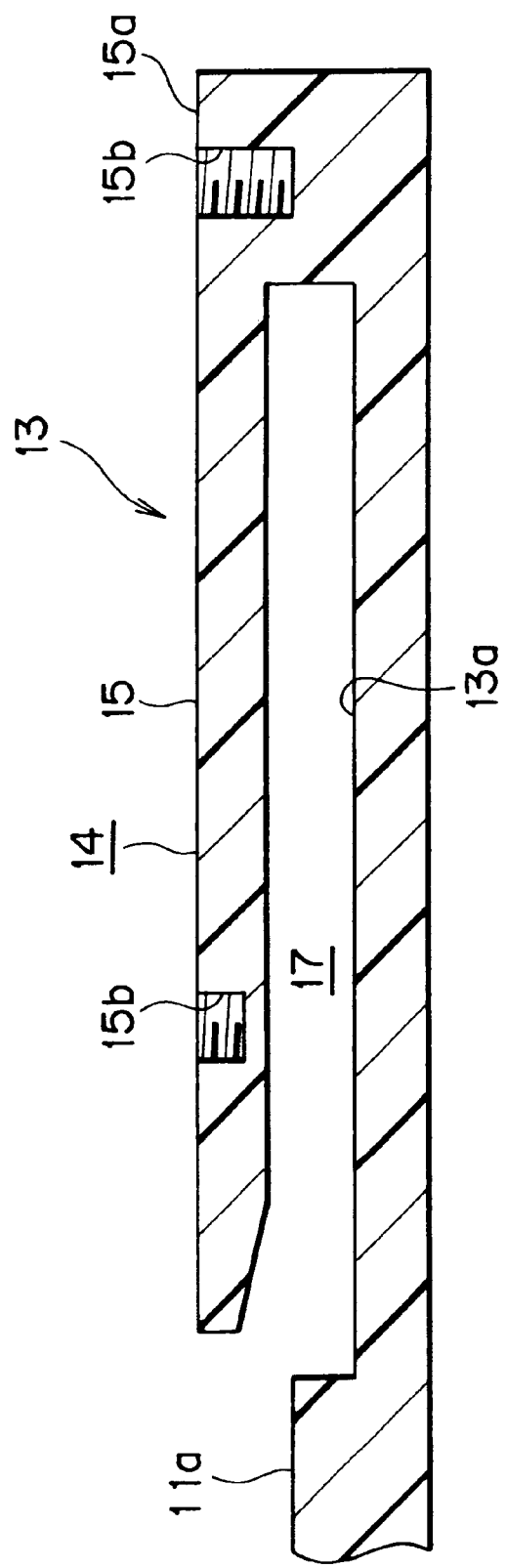
FIG. 4 is an enlarged cross-sectional view taken along line IV—IV of FIG. 3.
Figure 5:
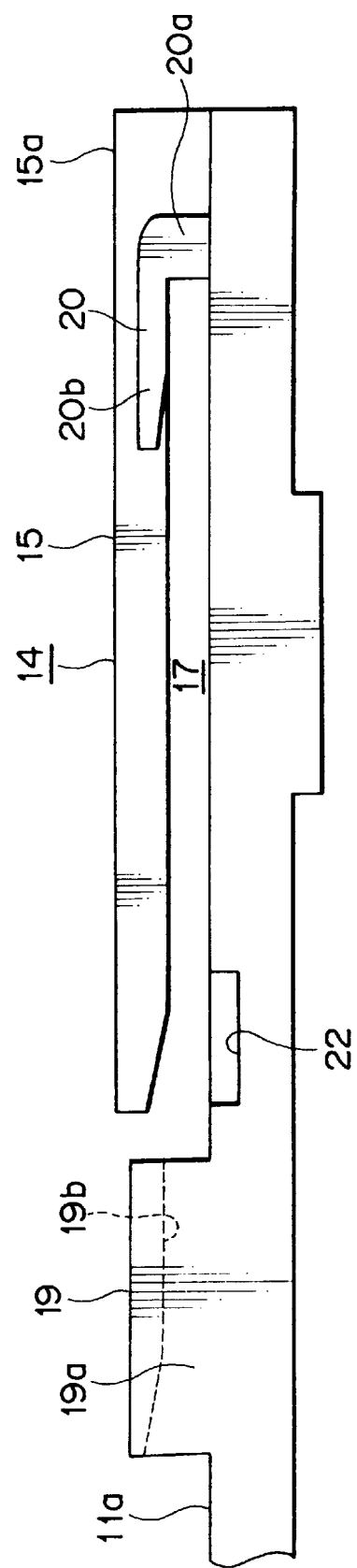
FIG. 5 is a view as viewed in the direction indicated by the arrow C in FIG. 3.

The circuit attachment plate 14 has a horizontally extending attachment member 15 positioned at the lower end of the circuit attachment 13 and a partially bent receiving member 16 extending substantially upwardly from a portion of the attachment member 15 near a right end thereof. The attachment member 15 has a left end 15a thicker than the remainder thereof and is contiguous to the rear surface 11a, as shown in FIGS. 4 and 5. The attachment member 15 has a pair of internally threaded holes 15b defined therein which are horizontally spaced from each other.

The portion of the attachment member 15 other than the left end 15a and the receiving member 16 are thinner than the left end 15a, and are spaced slightly upwardly from the rear surface 11a, as shown in FIGS. 4 and 5. An inner surface of the circuit attachment plate 14 and the rear surface 11a define an installation space 17 defined therebetween.

The circuit attachment 13 has three attachment protrusions 18 at horizontally spaced positions on its upper end and a position on its left end near the upper end thereof. The attachment protrusions 18 have respective internally threaded holes 18a defined therein, as shown in FIG. 3. The receiving member 16 of the circuit attachment plate 14 has an upper end connected to the attachment protrusion 18 in the right position on the upper end of the circuit attachment 13. The attachment protrusions 18 have respective rear surfaces lying substantially flush with the rear surface of the circuit attachment plate 14.

Figure 6:
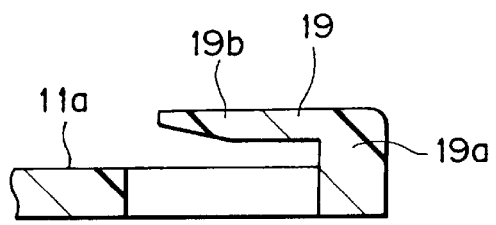
FIG. 6 is an enlarged cross-sectional view taken along line VI—VI of FIG. 3.

As shown in FIGS. 3 and 6, a plurality of horizontally elongate positioning ribs 19 are integrally mounted at horizontally spaced intervals on the lower edge of the rear surface 11a of the holding member 11. Each of the positioning ribs 19 comprises a base 19a projecting rearward from the holding member 11 and a holder 19b projecting upwardly from a rear edge of the base 19a.

A vertically elongate positioning rib 20 is integrally mounted on the rear surface 11a of the holding member 11 below the circuit attachment 13. As shown in FIGS. 3 and 5, the positioning rib 20 comprises a base 20a projecting rearward from the holding member 11 and a holder 20b projecting to the right from a rear edge of the base 20a.

Figure 7:
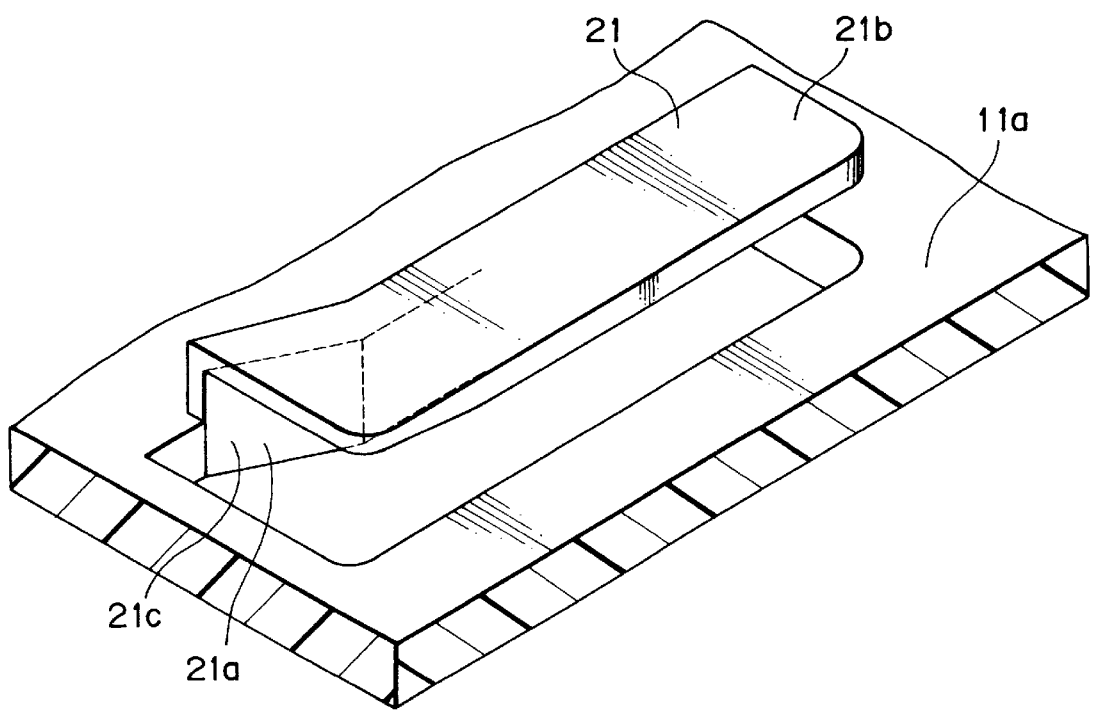
FIG. 7 is an enlarged perspective view of a positioning rib on an upper edge of the holding member.

A plurality of horizontally elongate positioning ribs 21 are integrally mounted at horizontally spaced intervals on the rear surface 11a of the holding member 11 near its upper edge. Each of the positioning ribs 21 comprises a base 21a projecting rearward from the holding member 11 and a holder 21b projecting downwardly from a rear edge of the base 21a. As shown in FIG. 7, the base 21a has a right end portion formed as a slanted portion 21c which is inclined progressively upwardly to the right.

As shown in FIGS. 3 and 5, a plurality of attachment recesses 22 are defined at peripherally spaced intervals in outer edges of the rear surface 11a of the holding member 11. As shown in FIG. 3, two internally threaded attachment holes 23 are defined at a vertically spaced interval in the right end of the rear surface 11a of the holding member 11. The rear surface 11a of the holding member 11 has a plurality of screw insertion holes 11b defined at a vertically spaced interval in the right and left ends thereof.

As shown in FIG. 2, the display panel 8 includes a metal frame 24 having an outer profile greater than the outer profile of the holder member 11. The metal frame 24 has a plurality of raised fingers 24a spaced at peripheral intervals and bent inwardly in alignment with the respective attachment recesses 22 of the holding member 11.

As shown in FIGS. 2 and 8, the display panel 8 also includes a tablet sensor board 25 in the form of a thin sheet having a connector circuit 25a disposed on the right end therefor for connection to a tablet output circuit, not shown. The tablet sensor board 25 has a pair of attachment holes 25b defined respectively in the upper and lower ends of the right end thereof.

As described above, the liquid crystal panel 9 and the light guide plate 10 are held on the front surface of the holding member 11, as shown in FIG. 2. The metal frame 24 is mounted on the holding member 11 in covering relation to the peripheral edges of the holding member 11.

The metal frame 24 is attached to the holding member 11 by fitting the metal frame 24 over the holding member 11 from its front side and bending the raised fingers 24a inwardly into the respective attachment recesses 22 defined in the peripheral edges of the holding member 11 (see FIG. 9).

As shown in FIGS. 9 and 10, a liquid crystal driver circuit board 26 with a liquid crystal driver circuit mounted thereon is attached to the circuit attachment plate 14 from its rear side. The liquid crystal driver circuit board 26 is attached to the circuit attachment plate 14 by threading attachment screws 27 into the internally threaded holes 15a in the attachment member 15 and the internally threaded holes 18a in the attachment protrusions 18 (see FIGS. 9 and 10).

After the liquid crystal panel 9 and the light guide plate 10 are held on the holding member 11 and the metal frame 24 and the liquid crystal driver circuit board 26 are attached, the tablet sensor board 25 is attached to the rear surface 11a of the holding member 11.

The tablet sensor board 25 is installed on the holding member 11 as follows:

The tablet sensor board 25 is slid from the right of the holding member 11 to the left with its lower and upper edges being inserted inwardly of the positioning ribs 19 and the positioning ribs 21. At this time, the tablet sensor board 25 can easily be inserted into position because the right ends portions of the bases 21a of the upper positioning ribs 21 are formed as the slanted portions 21c.

The tablet sensor board 25 is slid to the left until the left end portion thereof is inserted into the installation space 17 defined by the inner surface of the circuit attachment plate 14, as shown in FIG. 10. At the same time that the tablet sensor board 25 is inserted deeply into the installation space 17, a portion of the left end portion of the tablet sensor board 25 is inserted into the positioning rib 20 that is positioned below the circuit attachment plate 13.

The tablet sensor board 25 is now positioned on the holding member 11 by the positioning ribs 19, the positioning rib 20, and the positioning ribs 21.

Then, attachment screws 28 are inserted through the attachment holes 25b in the tablet sensor board 25 and threaded into the internally threaded attachment holes 23 in the right end of the holding member 11, thus completing the attachment of the tablet sensor board 25 to the holding member 11 (see FIG. 9). When the tablet sensor board 25 is thus attached to the holding member 11 which has held the liquid crystal panel 9 and the light guide plate 10 and to which the metal frame 24 and the liquid crystal driver circuit board 26 have been attached, the display panel 8 is completed (see FIG. 2).

The display panel 8 thus assembled is placed in the display unit 4, and the holding member 11 is fastened in place by screws that are inserted through the screw insertion holes 11b, with a front plate 29 (see FIG. 1) of glass or the like being disposed on the front surface of the liquid crystal panel 9.

As described above, the tablet sensor board 25 is positioned by the positioning ribs 19, the positioning rib 20, and the positioning ribs 21 on the holding member 11, and inserted into the installation space 17 and attached to the holding member 11.

Therefore, no dedicated jig needs to be used to position the tablet sensor board 25, and the tablet sensor board 25 is attached to the holding member 11 by being inserted into the installation space 17 defined by the inner surface of the circuit attachment plate 14 on which the liquid crystal driver circuit board 26 is mounted. Therefore, the tablet sensor board 25 can be positioned with highly reliable positioning accuracy, and the display panel 8 can be assembled with utmost ease.

Inasmuch as it is not necessary to use an adhesive tape to attach the tablet sensor board 25 to the holding member 11, the display panel 8 can be assembled easily in a short period of time. Thus, the display panel 8 can be mass-produced, and the tablet sensor board 25 is free of undesirable positional displacements which would otherwise occur when the adhesive tape would be degraded due to aging or temperature changes.

Furthermore, since the holding member 11 is molded of a resin material, it does not obstruct or impair the magnetic field that is generated when the operator enters data with an input stylus, thus allowing the operator to enter data appropriately through the display panel 8.

While the holding member 11 has been described as being molded of a resin material, it is not limited to a resin material, but may be made of any materials insofar as they do not obstruct or impair the magnetic field that is generated. The display panel 8 has been described as incorporating a liquid crystal display unit, it may comprise any of various thin sheet-like display units including an EL (ElectroLuminescent) display unit.

The display panel 8 can be manufactured at a reduced cost because the holding member 11 and the circuit attachment plate 14 are integrally formed with each other.

Although a certain preferred embodiment of the present invention has been shown and described in detail, it should be understood that various changes and modifications may be made therein without departing from the scope of the appended claims.

What is claimed is:

1. A display panel comprising:
   a thin sheet-like panel energizable by a driver circuit for displaying information;
   a holding member holding said thin sheet-like panel in covering relation to at least a portion of a rear surface of said thin sheet-like panel;
   a first edge positioning rib projecting from a rear surface of said holding member remote from a front surface thereof which holds said thin sheet-like panel, and extending along one edge of said holding member;
   a second edge positioning rib disposed on said holding member and extending along an opposite edge thereof remote from said first edge positioning rib;
   a sheet-like electromagnetic-induction-type tablet sensor board held on the rear surface of said holding member by said first edge positioning rib and said second edge positioning rib; and
   a driver circuit attachment plate supporting said driver circuit and mounted on said holding member to allow at least a portion of said tablet sensor board to be inserted between said driver circuit and said holding member,
   such that when said tablet sensor board is inserted between said driver circuit and said holding member, at least a portion of said tablet sensor board is between said driver circuit and said thin sheet-like panel.

2. A display panel according to claim 1, wherein said first edge positioning rib is of a bent hook shape and comprises:
   a base projecting vertically from the rear surface of said holding member; and
   a holder projecting from a distal end of said base toward said opposite edge of the holding member;
   wherein said second edge positioning rib is of a bent hook shape and comprises:
      a base projecting vertically from the rear surface of said holding member; and
      a holder projecting from a distal end of said base toward said one edge of the holding member.

3. A display panel according to claim 2, wherein said first edge positioning rib comprises a plurality of ribs disposed at spaced intervals along said one edge, and said second edge positioning rib comprises a plurality of ribs disposed at spaced intervals along said opposite edge.

4. A display panel according to claim 1, wherein said thin sheet-like panel comprises:
   a liquid crystal panel; and
   a light guide plate for guiding light from a light source to said liquid crystal panel.

5. A display panel according to claim 1, further comprising:
   a frame covering at least a portion of peripheral edges of said thin sheet-like panel, said thin sheet-like panel being sandwiched between said frame and said holding member.

6. A display panel according to claim 2, wherein
   said base of said first edge positioning rib includes an inner surface between said holder of said first edge positioning rib, substantially perpendicular to said rear surface of said holding member and facing toward said opposite edge of the holding member, and
   at least a portion of said inner surface is inclined toward said one edge of the holding member.

* * * * *